United States Patent
Lee et al.

(10) Patent No.: US 8,406,216 B2
(45) Date of Patent: Mar. 26, 2013

(54) METHOD OF TRANSMITTING RECEIVING A DATA IN A WIRELESS COMMUNICATION SYSTEM

(75) Inventors: Wook Bong Lee, Anyang-si (KR); Jin Sam Kwak, Anyang-si (KR); Sung Ho Moon, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 480 days.

(21) Appl. No.: 12/687,511

(22) Filed: Jan. 14, 2010

(65) Prior Publication Data

US 2010/0177727 A1 Jul. 15, 2010

Related U.S. Application Data

(60) Provisional application No. 61/145,111, filed on Jan. 15, 2009, provisional application No. 61/149,008, filed on Feb. 1, 2009.

(30) Foreign Application Priority Data

Apr. 13, 2009 (KR) ........................ 10-2009-0031854

(51) Int. Cl.
*H04J 3/06* (2006.01)
*H04W 4/00* (2009.01)
(52) U.S. Cl. ........................ 370/350; 370/329
(58) Field of Classification Search .................. 370/329, 370/339, 338, 465, 350
See application file for complete search history.

(56) References Cited

U.S. PATENT DOCUMENTS

| | | | |
|---|---|---|---|
| 7,307,973 B2* | 12/2007 | Song et al. | 370/331 |
| 7,782,816 B2* | 8/2010 | Cho et al. | 370/329 |
| 2005/0288020 A1 | 12/2005 | Cho et al. | |
| 2008/0130486 A1 | 6/2008 | Lim et al. | |
| 2008/0205364 A1 | 8/2008 | Park et al. | |

FOREIGN PATENT DOCUMENTS

KR 10-2008-0091027 10/2008

OTHER PUBLICATIONS ("The Draft IEEE 802.16m System Description Document"; Hamiti, Shkumbin; Nokia; IEEE 802.16m-08/003r3; Jun. 16, 2008).*
Ron Murias, "IEEE802.16m Amendment Working Document", IEEE802.16 Broadband Wireless Access Working Group IEEE802.16m-08/050, Dec. 11, 2008, p. 11-22.
Lee et al., "Frame structure supporting the Wireless MAN-OFDMA frames", IEEE C802.16m-09_0475r1, Mar. 2, 2009.
Moon et al., "Legacy Supports in the Frame Structures for 8.75Mhz and 7Mhz", IEEE802.16 Broad band Wireless Access Working Group IEEE C802.16m-09/0908, Apr. 27, 2009.

* cited by examiner

*Primary Examiner* — Ian N Moore
*Assistant Examiner* — Afshawn Towfighi
(74) *Attorney, Agent, or Firm* — McKenna Long & Aldridge LLP

(57) ABSTRACT

A method of transmitting and receiving data in a wireless communication system is disclosed. According to an embodiment of the present invention, a base station (BS) transmits downlink data to a first mobile station supporting a first system via a first zone of a frame and transmitting downlink data to a second mobile station supporting a second system via a second zone located behind the first zone by a frame offset on a time axis, wherein the first zone includes the odd number of OFDM symbols and wherein the frame offset is an offset between a start point of a frame for the first system and a start point of a frame for the second system.

12 Claims, 6 Drawing Sheets

Prior-art

Prior-art

METHOD OF TRANSMITTING RECEIVING A DATA IN A WIRELESS COMMUNICATION SYSTEM

CROSS-REFERENCE TO RELATED APPLICATIONS

Pursuant to 35 U.S.C. §119(e), this application claims the benefit of priority to Provisional Application No. 61/145,111, filed on Jan. 15, 2009, Provisional Application No. 61/149, 008, filed on Feb. 1, 2009, and Korean application No 10-2009-0031854, filed on Apr. 13, 2009 the contents of which are incorporated by reference herein in their entirety.

FIELD OF INVENTION

The present invention relates to a wireless communication system, and more particularly, to a method of transmitting and receiving data in a wireless communication system.

DESCRIPTION OF THE RELATED ART

Recently, standardization of IEEE 802.16m system is ongoing to be established. Yet, at the timing point of commercializing the IEEE 802.16m system in the future, the conventional IEEE 802.16e mobile station (MS) will propagate globally. Therefore, the IEEE 802.16m system needs to be standardize to maintain compatibility with the IEEE 802.16e system and also needs a frame structure capable of supporting 802.16e mobile station.

Frame in IEEE 802.16m system includes a plurality of subframes. Each of the subframes includes a plurality of subcarriers on a frequency axis and a plurality of OFDM symbols on a time axis. Some of a plurality of subframes included in one frame are used to transmit uplink (UL) data and the rest of the subframes are used to transmit downlink (DL) data.

In order to support IEEE 802.16e mobile station, some of DL subframes are used for the IEEE 802.16e system and the rest of the DL subframes are used for IEEE 802.16m system. A zone used for the IEEE 802.16e system is named a wireless metropolitan area networks orthogonal frequency division multiple access downlink zone (hereinafter abbreviated wirelessMAN OFDMA zone) and a zone used for the IEEE 802.16m system is named an advanced air interface downlink zone (hereinafter abbreviated advanced air interface DL zone).

A DL frame structure of IEEE 802.16m system according to a related art is explained with reference to FIG. 1 and FIG. 2 as follows.

FIG. 1 is a diagram for a DL frame structure according to a related art if a frame offset is set to 1. FIG. 2 is a diagram for a DL frame structure according to a related art if a frame offset is set to 2.

A frame offset according to a related art is defined in a manner that an offset between a start point of a frame for IEEE 802.16e system and a start point of a frame for IEEE 802.16m system is defined by a subframe unit. Yet, as the frame for the IEEE 802.16m system includes at least one DL subframe, a frame offset is an integer equal to or greater than 1 and smaller than the number of DL subframes. For instance, if one frame includes 5 DL subframes, a frame offset is an integer equal to or greater than 1 and smaller than 5.

There are three kinds of types for subframes of the IEEE 802.16m system. Type-1 includes 6 OFDM symbols, type-2 includes 7 OFDM symbols, and type-3 includes 5 OFDM symbols.

Referring to FIG. 1 and FIG. 2, in a frame structure according to a related art, a frame offset is defined as a type-1 subframe. In particular, referring to FIG. 1, a wirelessMAN OFDMA DL zone includes 6 OFDM symbols. Referring to FIG. 2, a wirelessMAN OFDMA DL zone includes OFDM symbols. A preamble is assigned to first OFDM symbol of a frame for IEEE 802.16e system and FCH and DL-MAP are assigned to second and third OFDM symbols thereof, respectively.

As subchannelization methods for IEEE 802.16e system, there are partial usage of subchannel (hereinafter abbreviated 'PUSC'), full usage of subchannel (hereinafter abbreviated 'FUSC'), and adaptive modulation and coding (hereinafter abbreviated 'AMC'). The PUSC includes 2 OFDM symbols, the FUSC includes 1 OFDM symbol, and the AMC includes 3 OFDM symbols. And, the second and third OFDM symbols having the FCH and DL-MAP assigned thereto are subchannelized by the PUSC.

Therefore, referring to FIG. 1 and FIG. 2, odd number of OFDM symbols exist in a remaining part remaining after excluding the preamble, FCH and DL-MAP-assigned parts from the wirelessMAN OFDMA DL zone.

However, when the odd number of OFDM symbols are subchannelized, the FUSC or Band-AMC should be used. So, a control message should be sent to a mobile station to announce that the subchannelization method has been changed. If subchannelization is performed by PUSC scheme and is then performed to another scheme, it is unable to use a resource continuously.

However, as mentioned in the foregoing description, a frame structure of a related art has to send a control message to inform a mobile station of a change of a subchannelizing scheme, whereby overhead is increased. As the subchannelizing scheme is changed, it is unable to use a resource continuously, whereby a radio resource is wasted.

SUMMARY

Accordingly, the present invention is directed to a method of transmitting and receiving data in a wireless communication system that substantially obviates one or more of the problems due to limitations and disadvantages of the related art.

An object of the present invention is to provide a method of transmitting data using a frame structure, by which efficiency of a wireless communication system can be raised.

Another object of the present invention is to provide a method of transmitting data, by which overhead can be reduced and by which a radio resource can be efficiently used.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting data, at a base station (BS), in a wireless communication system, includes transmitting downlink data to a first mobile station supporting a first system via a first zone of a frame and transmitting downlink data to a second mobile station supporting a second system via a second zone located behind the first zone by a frame offset on a time axis, wherein the first zone includes the odd number of OFDM symbols and wherein the frame offset is an offset between a start point of a frame for the first system and a start point of a frame for the second system.

To further achieve these and other advantages and in accordance with the purpose of the present invention, a method of receiving data, at a mobile station (MS) in a wireless communication system includes receiving downlink data via a second zone of a frame located by a frame offset behind a first zone of the frame used to transmit downlink data to another user equipment supporting a system different from that supported by the user equipment, wherein the first zone includes the odd number of OFDM symbols and wherein the frame offset is an offset between a start point of a frame for a first system and a start point of a frame for a second system.

Preferably, the frame offset is defined as an integer and wherein the number of OFDM symbols between the start point of the frame for the first system and the start point of the frame for the second system is (the frame offset*6−1) or (5+6*(the frame offset−1)).

Preferably, the wireless communication system supports a first type subframe including 6 OFDM symbols and a second type subframe including 5 OFDM symbols.

More preferably, the frame offset is defined as a subframe unit and wherein a first subframe of the first zone is the second type subframe.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

Reference will now be made in detail to the preferred embodiments of the present invention, examples of which are illustrated in the accompanying drawings, to facilitate those having ordinary skill in the art to implement the invention. The present invention can be implemented in various forms, which is non-limited by the following embodiments. To clearly describe the present invention, parts irrespective of the description are omitted from the drawings. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection. Moreover, such a terminology as '~part' '~functionality', '~module' and the like means a unit for handling at least one function or operation, which can be implemented by software, hardware or combination thereof.

In addition, in the following description, the term "terminal" is used to generally describe any stationary or mobile user device such as a Mobile Station (MS) or a User Equipment (UE). The term "Base Station (BS)" is used to generally describe any network node such as a Node B or an eNode B that communicates with a terminal.

In the following description, a frame structure of a wireless communication system according to an embodiment of the present invention is explained with reference to FIG. 4.

Figure 3:
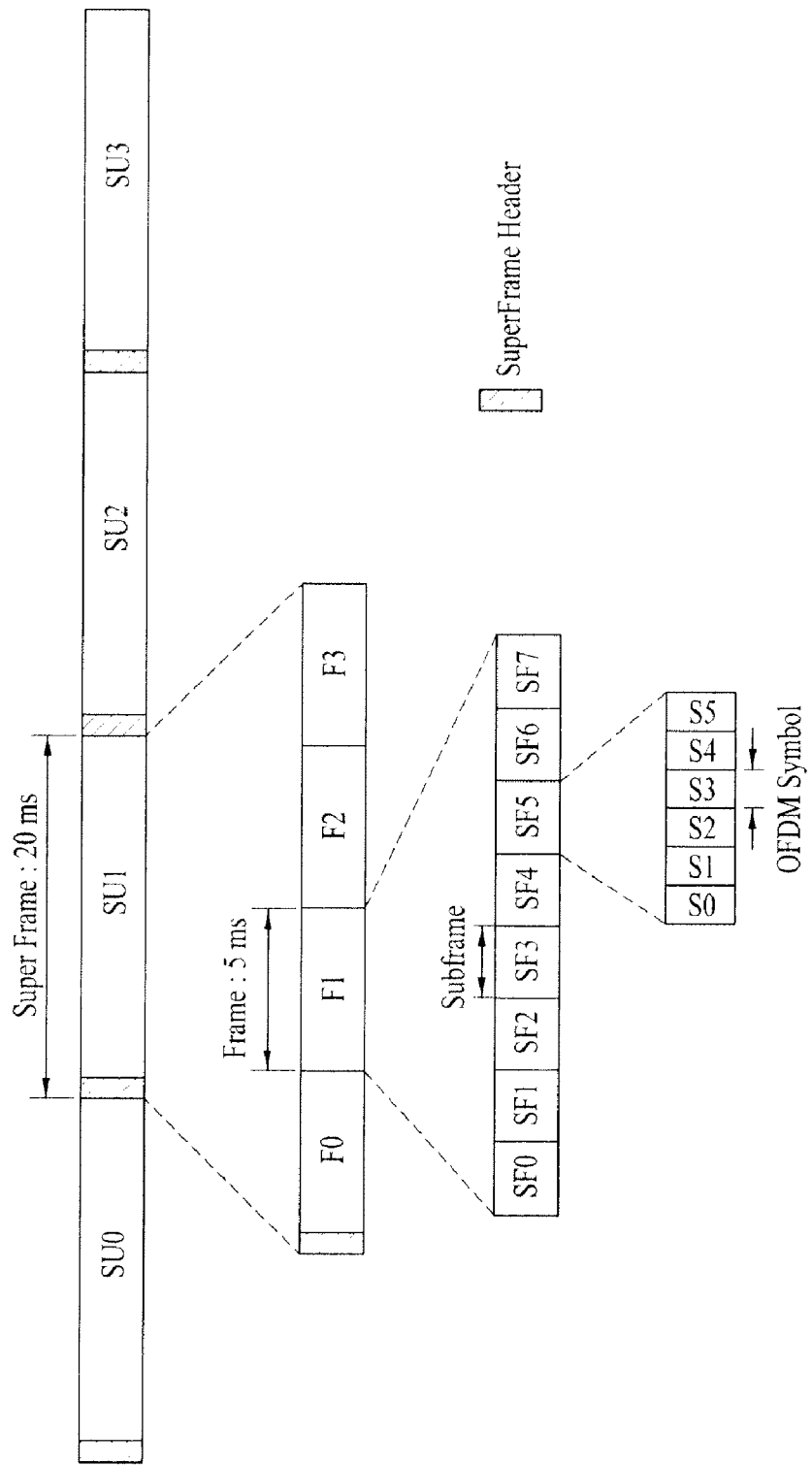
FIG. 3 is a diagram for a frequency division duplex (FDD) frame structure of a in wireless communication system.

FIG. 3 is a diagram for a frequency division duplex (FDD) frame structure of a wireless communication system.

Referring to FIG. 3, a superframe starts with a superframe header (SFH) and includes 4 frames. And, each of the frames includes 8 subframes.

Each of the subframes includes a plurality of subcarriers on a frequency axis and a plurality of OFDM symbols on a time axis. In particular, each of the subframes can include 5, 6 or 7 OFDM symbols on a time axis. According to the number of OFDM symbols included in the corresponding subframe, subframes can be classified into 3 kinds of types. A type-1 subframe includes 6 OFDM symbols. A type-2 subframe includes 7 OFDM symbols. And, a type-3 subframe includes 5 OFDM symbols.

8 subframes included in one frame are used for UL or DL transmission. Frequency division duplexing (hereinafter abbreviated 'FDD') or time division duplexing (hereinafter abbreviated 'TDD') can be performed on a part for the UL transmission and a part for the DL transmission. A frame, in which the UL transmission part and the DL transmission are duplexed by FDD scheme, is named an FDD frame. A frame, in which the UL transmission part and the DL transmission are duplexed by TDD scheme, is named a TDD frame.

According to an embodiment of the present invention, DL data is transmitted to a mobile station (MS) supporting a first system and a mobile station supporting a second system through a frame in which a UL transmission part and a DL transmission part are duplexed by TDD scheme.

In the following description, a TDD frame structure of a wireless communication system according to an embodiment of the present invention is explained with reference to FIG. 4.

Figure 4:
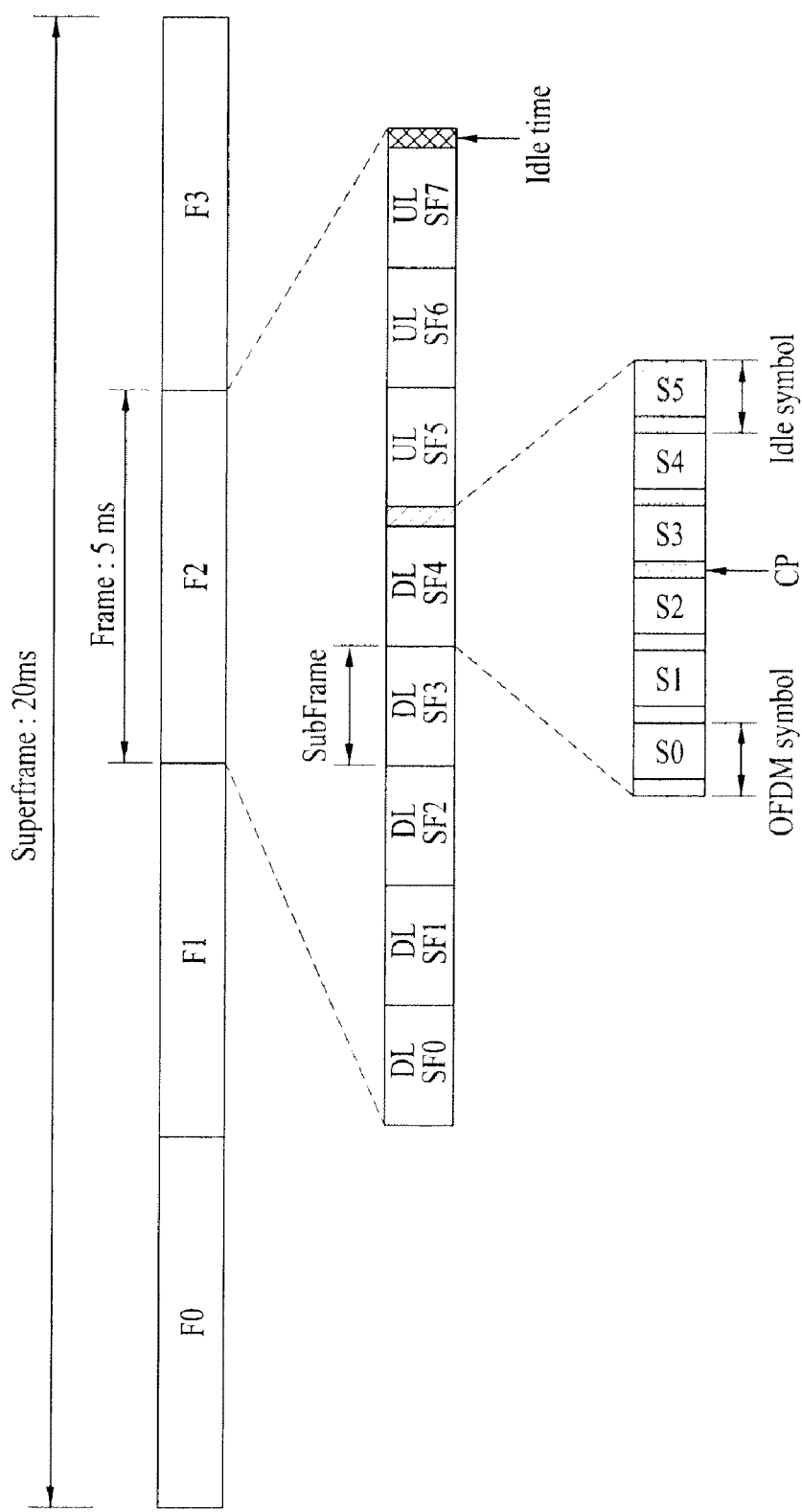
FIG. 4 is a diagram for a time division duplex (TDD) frame structure in wireless communication system.

FIG. 4 is a diagram for a TDD frame structure of a wireless communication system.

First of all, a TDD frame is divided into a zone for DL transmission and a zone for UL transmission on a time axis. In particular, some of a plurality of subframes included in a frame are used for DL transmission and the rest of the subframes are used for UL transmission. The number of subframes used for the DL transmission and the number of subframes used for the UL transmission are determined according to a ratio of DL to UL. For instance, preceding 5 subframes of 8 subframes included in one frame are used for the DL transmission and rest 3 subframes thereof are used for the UL transmission.

A switching time exists between a DL frame and a UL frame.

In the following description, a method of transmitting data at a base station of a wireless communication system according to an embodiment of the present invention to a mobile station supporting a first system and a mobile station supporting a second system is explained.

In a wireless communication system according to an embodiment of the present invention, a plurality of DL subframes included in a frame are divided into a first zone and a second zone. A DL signal is transmitted to a mobile station supporting a first system via the first zone. And, a DL signal is transmitted to a mobile station supporting a second system via the second zone.

In the following description, a DL frame structure according to an embodiment of the present invention is explained with reference to FIG. 5 and FIG. 6.

Figure 5:
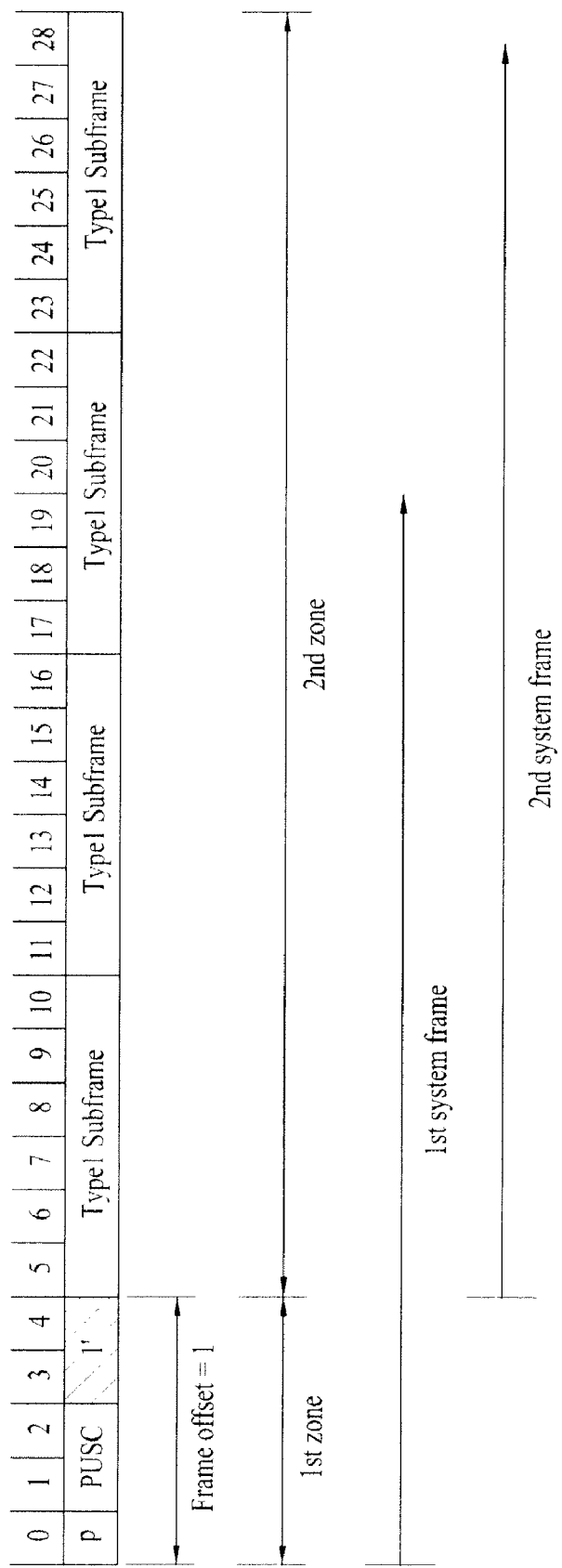
FIG. 5 is a diagram for a DL frame structure according to an embodiment of the present invention I a frame offset is set to 1.

FIG. 5 is a diagram for a DL frame structure according to an embodiment of the present invention when a frame offset is set to 1. And, FIG. 6 is a diagram for a DL frame structure according to an embodiment of the present invention when a frame offset is set to 2. In this case, the frame offset is an offset between a start point of a frame for a first system and a start point of a frame for a second system.

Figure 6:
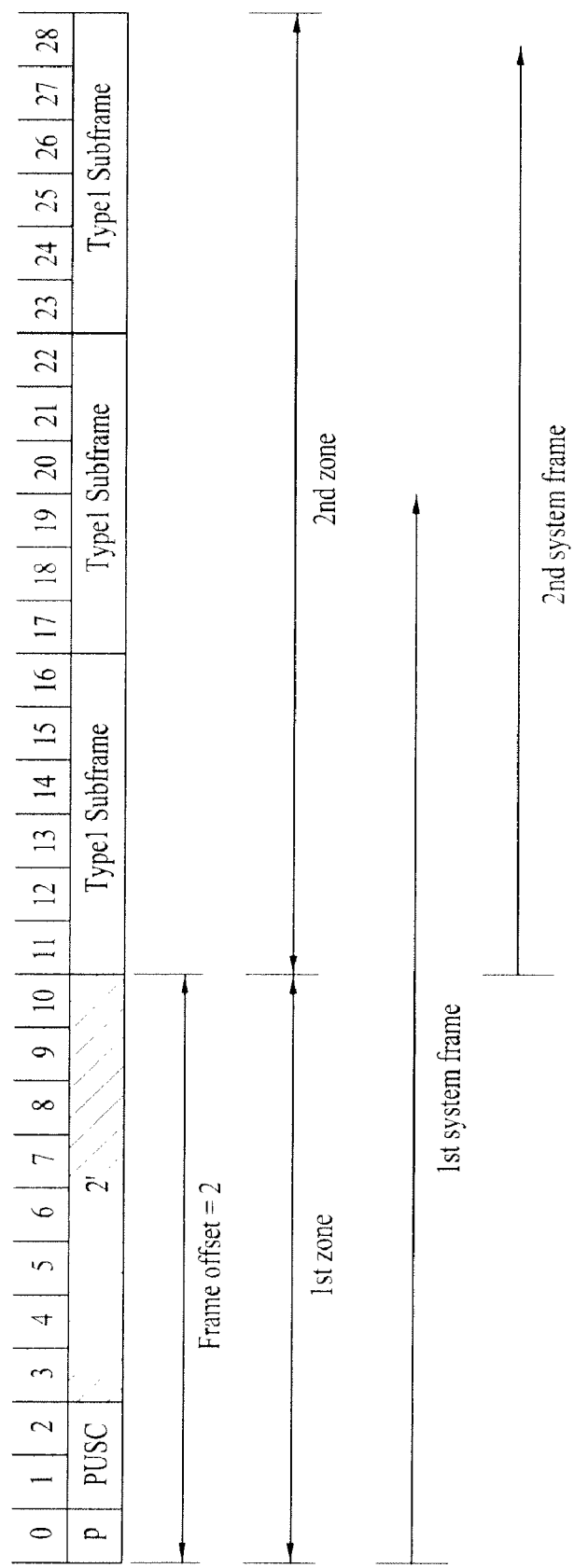
FIG. 6 is a diagram for a DL frame structure according to an embodiment of the present invention I a frame offset is set to 2.

In FIG. 5 and FIG. 6, a horizontal axis indicates time, 'p' indicates a preamble of a first system, and 'PUSC' indicates a symbol subchannelized by PUSC scheme. A first zone is provided to communicate with a mobile station supporting a first system. A second zone is provided to communicate with a mobile station supporting a second system. A frame for a first system starts with a first symbol of the first zone. And, a frame for a second system starts with a first OFDM symbol of the second zone.

Figure 1:
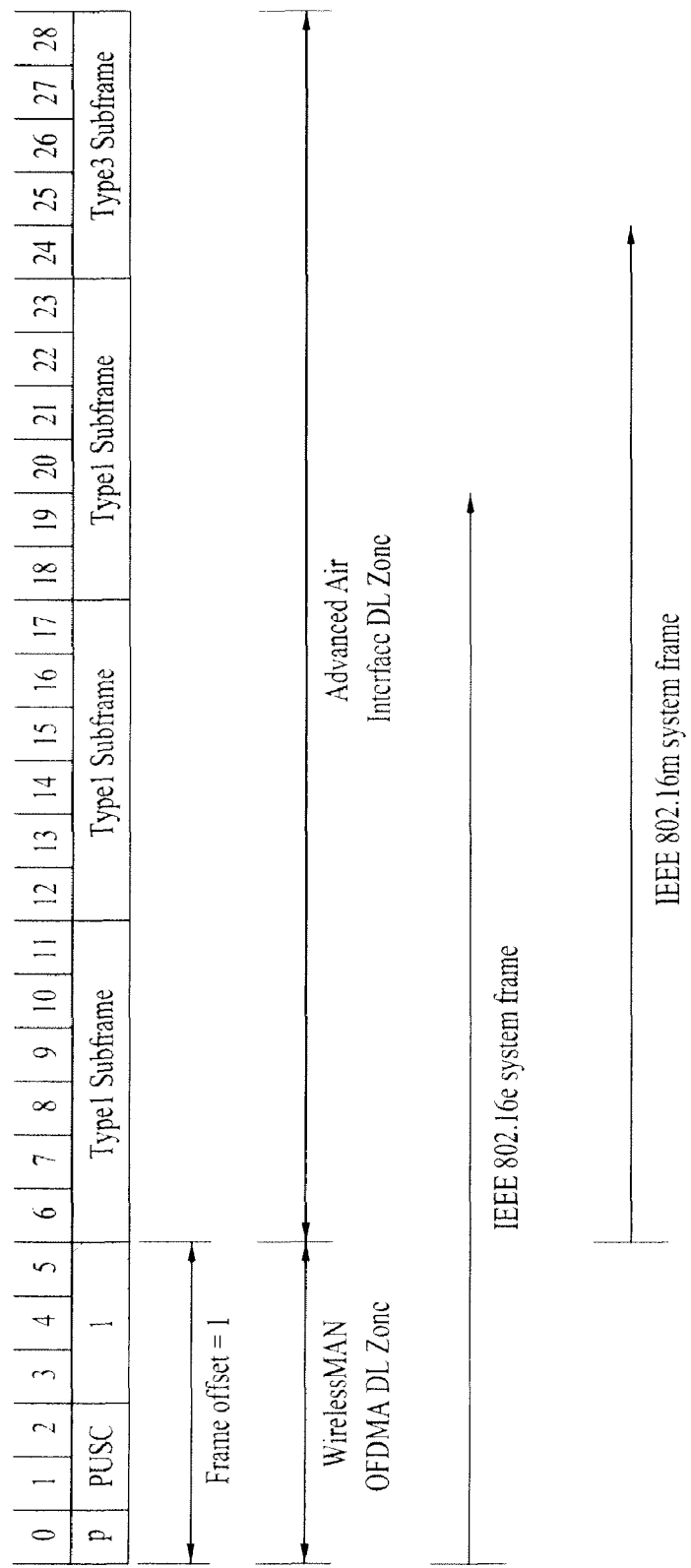
FIG. 1 is a diagram for a DL frame structure according to a related art if a frame offset is set to 1.
Figure 2:
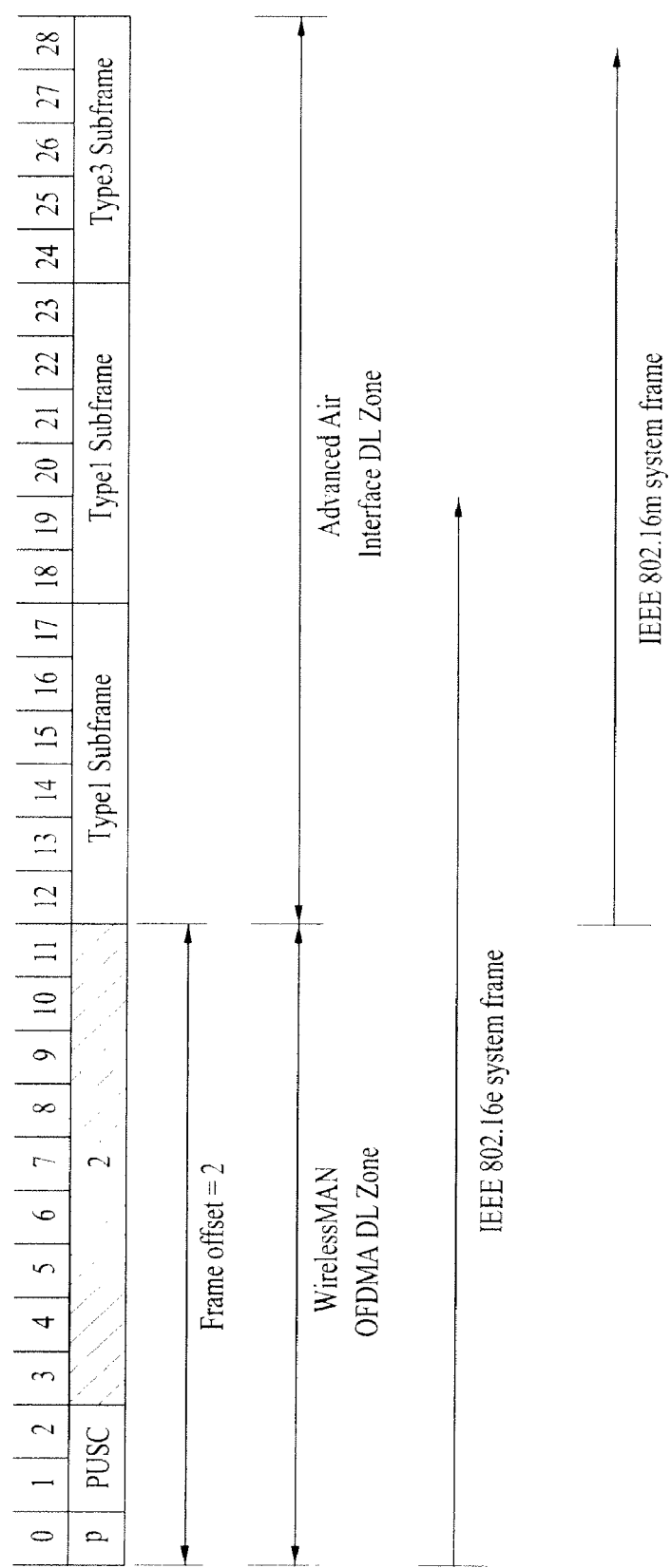
FIG. 2 is a diagram for a DL frame structure according to a related art if a frame offset is set to 2.

Referring to FIG. 5 and FIG. 6, a DL includes 29 OFDM symbols. A first zone includes (6*n−1) OFDM symbols. In this case, 'n' is an integer equal to or greater than 1 and equal to or smaller than 3 (or 4), (n is integer). In particular, the first zone shown in FIG. 1 includes 5 OFDM symbols. And, the second zone shown in FIG. 2 includes 11 OFDM symbols.

The first zone includes Type-3 subframe at the head part. Referring to FIG. 5, if a frame offset is set to 1, the first zone includes one type-3 subframe. Referring to FIG. 6, if a frame offset is set to 2, the first zone includes one type-3 subframe and one type-1 subframe. Each time the number of frame offsets is incremented by 1, the number of the type-1 subframes included in the first zone is incremented by 1. In particular, the frame offset includes the type-3 subframe and can include the type-1 subframe in addition.

Therefore, a frame offset according to an embodiment of the present invention can be defined by two kinds of schemes as follows.

According to a first scheme, a frame offset is an offset, which is defined as an integer, between a start point of a frame for a first system and a start point of a frame for a second system. If the frame offset is n, the number of OFDM symbols between the start points of the first and second system frames is (6*n−1) or 5+6*(n−1).

According to a second scheme, a frame offset is an offset, which is defined by a subframe unit, between a start point of a frame for a first system and a start point of a frame for a second system. A first DL frame of a first zone is a type-3 subframe.

Referring to FIG. 5 and FIG. 6, the even number of OFDM symbols exist in a remaining part resulting from excluding parts having preamble, FCH and DL-MAP assigned thereto from a first zone. Hence, it is able to subchannelize all OFDM symbols of the first zone by PUSC scheme.

An embodiment of the present invention can be implemented using various means. For instance, embodiments of the present invention can be implemented using hardware, firmware, software and/or any combinations thereof. In the implementation by hardware, a data transmitting/receiving method according to one embodiment of the present invention can be implemented by at least one selected from the group consisting of ASICs (application specific integrated circuits), DSPs (digital signal processors), DSPDs 9 digital signal processing devices), PLDs (programmable logic devices), FPGAs (field programmable gate arrays), processor, controller, microcontroller, microprocessor and the like.

In case of the implementation by firmware or software, a data transmitting/receiving method according to one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

Accordingly, the present invention provides the following effects or advantages.

First of all, all OFDM symbols can be subchannelized by one scheme in a manner that a subframe including 5 OFDM symbols is included in a frame offset, whereby overhead can be reduced.

Secondly, the present invention enables a frame offset to include OFDM symbols amounting to the number of (6N−1), thereby using a radio resource efficiently.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

And, it is apparently understandable that an embodiment is configured by combining claims failing to have relation of explicit citation in the appended claims together or can be included as new claims by amendment after filing an application.

What is claimed is:

1. A method of transmitting data, at a base station (BS), in a wireless communication system, the method comprising:
   transmitting downlink data to a first mobile station (first MS) supporting a first system via a first zone of a frame; and
   transmitting downlink data to a second mobile station (second MS) supporting a second system via a second zone located behind the first zone by a frame offset on a time axis,
   wherein the first zone includes an odd number of orthogonal frequency division multiplexing (OFDM) symbols and wherein the frame offset is an offset between a start point of a frame for the first system and a start point of a frame for the second system,
   wherein the frame offset is defined as a number of subframe, and
   wherein a number of OFDM symbol of the first zone is (the frame offset*6−1) or (5+6*(the frame offset−1)).

2. The method of claim 1, wherein the wireless communication system supports a type-1 subframe including 6 OFDM symbols and a type-3 subframe including 5 OFDM symbols.

3. The method of claim 1, wherein second and third OFDM symbols of the first zone are subchannelized by PUSC (partial usage of subchannel) scheme.

4. The method of claim 1, wherein the first zone includes a type-3 subframe when the frame offset is 1.

5. The method of claim 1, wherein the first zone includes a type-1 subframe and a type-3 subframe when the frame offset is 2.

6. The method of claim 5, wherein a first subframe of the first zone is the type-3 subframe.

7. A method of receiving data, at a second mobile station (second MS), in a wireless communication system, the method comprising:

receiving downlink data via a second zone of a frame located by a frame offset behind a first zone of the frame used to transmit downlink data to a first mobile station (first MS) supporting a first system different from that a second system supported by the second MS, wherein the first zone includes an odd number of orthogonal frequency division multiplexing (OFDM) symbols and wherein the frame offset is an offset between a start point of a frame for the first system and a start point of a frame for the second system, wherein the frame offset is defined as a number of subframe, and wherein a number of OFDM symbol of the first zone is (the frame offset *6−1) or (5+6* (the frame offset−1)).

8. The method of claim 7, wherein the wireless communication system supports a type-1 subframe including 6 OFDM symbols and a type-3 subframe including 5 OFDM symbols.

9. The method of claim 7, wherein the first zone includes a type-3 subframe when the frame offset is 1.

10. The method of claim 7, wherein the first zone includes a type-1 subframe and a type-3 subframe when the frame offset is 2.

11. The method of claim 10, wherein a first subframe of the first zone is the type-3 subframe.

12. The method of claim 7, wherein the system supported by the mobile station is a WirelessMAN-OFDMA system and the system supported by the another mobile station is a Advanced Air Interface (AAI) system.

* * * * *